United States Patent Office 3,502,639
Patented Mar. 24, 1970

3,502,639
NOVEL ORIENTED STRUCTURES OF LINEAR POLYETHYLENE AND A METHOD FOR THEIR PREPARATION
William O. Statton, Wilmington, Del., assignor to E. I. du Pont de Nemours and Company, Wilmington, Del., a corporation of Delaware
No Drawing. Filed Jan. 23, 1967, Ser. No. 610,778
Int. Cl. C08f 47/14; B29d 7/24
U.S. Cl. 260—94.9               7 Claims

ABSTRACT OF THE DISCLOSURE

A process for obtaining coherent, oriented highly crystalline polymer sheet structures by depositing single crystal platelets of linear polyethylene into a thin cake, heating the cake at a temperature slightly below its melting point and applying a shear stress in at least one direction in the plane of the cake to form a film thereof.

---

Polymeric compositions have been recognized and prepared for many years. It has long been believed that such compositions were incapable of existing in a wholly crystalline form. Thus, even though it has been possible to orient polymeric structures by a process involving a drawing or stretching operation and thereby produce small areas of crystallinity surrounded by amorphous areas, the existence of crystalline polymeric materials substantially devoid of amorphous areas has not been recognized. More recently, however, it has been found that certain linear polymers may be crystallized under carefully controlled conditions to produce completely crystalline polymeric materials. It has been reported, further, that layered structures may be formed from single crystals of linear polyethylene but such structures are brittle, they are easily separated or cleaved and they have little utility.

According to the present invention there is provided a process for obtaining coherent, oriented, highly crystalline polymer sheet structures, which process comprises depositing single crystal platelets of linear polyethylene into a thin cake, heating said cake at a temperature slightly below its melting point and applying a shear stress in at least one direction in the plane of said cake.

The single crystal platelets can be grown and deposited into a cake in the manner reported in the articles: W. O. Statton and P. H. Geil, J. Appl. Polymer, Sci., 3 357 (1960), and W. O. Statton, J. Appl. Phys., 32 2332 (1961). Briefly stated, the crystals are grown by cooling dilute solutions of high density essentially linear polyethylene in tetrachloroethylene. The density of the polyethylene used is between 0.94 and 0.98 grams per cubic centimeter. The polyethylene resin can be dissolved in various other organic solvents also such as trichloroethylene, toluene, xylene, tetralin, decalin, etc. The concentration of the polyethylene in the solution should not exceed about 2 percent by weight. Above this concentration spherulitic crystals are formed also which preclude obtaining a cake of single crystal platelets only. The crystals can be collected as a cake by filtering or preferably by decantation and evaporation of the solvent from the concentrated slurry. The cake thickness is not critical but preferably it should be about 10 mils thick. If the cake is much thinner, it is difficult to handle; and if it is much thicker, the solvent removal becomes very slow. The lamellar nature of the crystals provides a layered aggregate with a thickness of several mils. At this stage a preferred orientation of the molecular axis of the structure is indicated by X-ray diffraction, but the cake is easily separated or cleaved into separate layers.

After heating for several minutes, especially at a temperature between about 120° C. and 137° C. the cake becomes very coherent, and it is no longer subject to micaceous cleavage and is sufficiently tough that it can be deformed without breaking. The sintered aggregate shows a remarkable change in extensibility; the elongation results in Table 1 for items 1 and 2 are quantitative evidence of the cohesiveness caused by the sintering.

TABLE 1.—STRESS-STRAIN RESULTS FOR CRYSTALLINE LINEAR POLYETHYLENE STRUCTURES

| Item | T [a] | E [b] | $M_i$ [c] |
|---|---|---|---|
| 1. No sintering; calendered (R.T.) 1 way | 0.33 | 3 | 26 |
| 2. Sintered at 125° C.; calendered (R.T.) 1 way | [d] 0.70 | 840 | 20 |
| 3. Sintered at 125° C.; calendered (R.T.) 1 way and drawn in Instron | 5 | 33 | 29 |
| 4. Sintered at 125° C.; calendered (125° C.) 1 way | 2 | 110 | 15 |
| 5. Sintered at 125° C.; Hand drawn~40X on hot plate at~130° C | 7.5 | 10 | 117 |
| 6. Sintered at 125° C.; No calendering. Stress in the *lateral* direction | 0.2 | 1 | 25 |

[a] Tenacity in grams per denier as measured on films by ASTM-D882, and on fibers by ASTM-D-2101-64T.
[b] Elongation in percentages as measured on films by ASTM-D882, and on fibers by ASTM-D-2101-64T.
[c] Initial modulus as measured on films by ASTM-D882, and on fibers by ASTM-D-2101-64T.
[d] Calculated using original denier; if calculated on a denier at break basis, $T_0 = 6.6$.

During recrystallization each platelet devours itself in localized areas and the vacated space in each lamella thus provides the growing room for the refolding of the chains in adjacent platelets, the layers thereby losing their individuality. Electron micrographs of the shadowed surface of the aggregate show diamond shaped layers before sintering which are absent after sintering. Polymer recrystallization of this type therefore appears to be a cooperative phenomenon.

After annealing, the molecules still show an orientation perpendicular to the platelet or cake thickness. This means that the process of growing platelet crystals, followed by their deposition, drying, and annealing becomes a new and novel way to orient polymer molecules into a coherent macroscopic body without the usual mechanical strain induced upon the system by a deformation process.

The sintered aggregate is a unique product compared to the usual polymer bodies. It is extremely ductile and malleable in shear and yet will not flow under axial compression. In this state it could be pulled laterally in the Instron, a novel stress-strain test since it means that tensile properties could be measured in an across-the-chain direction instead of the usual along-the-chain axis. The results shown as item 6 in Table 1.

In order to obtain a coherent sintered aggregate the annealing step must be carried out at a temperature at least esual to the lowest temperature at which X-ray long period spacing is increased. Below that temperature the aggregate remains brittle and fracturable. Increases in the X-ray long period spacing are detected by a conventional small angle X-ray diffraction technique, as discussed for example by W. O. Statton in Chapter 6 of "Newer Methods of Polymer Characterization," edited by Bacon Ke, Interscience Publishers, 1964. For linear polyethylene the lowest temperature at which the X-ray long period is increased is 110° C. The upper limit of the annealing temperature is just below the melting point of the cake. For trouble-free, safe operation, the highest annealing temperature should be about 5° C. below the melting point of said cake. Within this range any temperature is suitable for the practice of this invention. Naturally, the higher the annealing temperature the shorter the time required for obtaining the coherent sintered material. Preferably, the annealing step is carried out at a temperature between about 115° C. and about 130° C.

The annealing can be carried out in air or in an immersion bath of ethylene glycol, glycerol, Wood's metal or other suitable liquid. Sintering takes place much faster in an immersion bath than in air. Comparable results are obtained by heating the cake at 127° C. for 30 minutes and for 2 seconds, in air and in ethylene glycol, respectively.

The cooling rate after annealing is not critical. The same good results are obtained when the sintered aggregate is cooled rapidly as when it is cooled very gradually.

The sintered aggregate is easily deformed by shear stresses; pieces of clear film can be obtained even by hand stroking with a hard object. The extreme ductility and malleability is striking, and it is unlike any other form of polymer. It is reasonable to compare the difference in behavior of a metal in its single crystal versus polycrystalline states to the difference in behavior of polymer in this annealed lamellar versus spherulitic states.

No flow occurs when a layer of the sintered aggregate is put in a Carver press at 15,000 p.s.i. Normal bulk polymer flows under the same conditions. This lack of flow is also demonstrated by failure to press spin a fiber by putting a layer of the sintered aggregate into the bore of a spinneret. The spinneret capillary gives way rather than any of the polymer flowing. Thus, resistance to axial compression is large. However, flow occurs when a chunk of sintered aggregate is pressed in a direction perpendicular to the chain axis, i.e., when the shear stress is applied along a direction in the plane of the sintered aggregate. This deformation produces a thin film which is tough, flexible, and almost clear except for striations or bands about ½ mm. in width.

Calendering the sintered aggregate at room temperature on a small machine yields a slightly translucent and reasonably strong film, as shown by items 2 and 3 in Table 1. The calendering deformation is insufficient to elongate the material to its full extent. Item 3 in Table 1 was drawn 800% in the Instron, removed to have its "denier" measured, and then extended to break.

When calendered hot on a large commercial machine, a very much greater extension is obtained during the rolling. The film is now very clear and very crackly. It is strong (item 4 in Table 1) but splits readily along the rolling direction. If a second calendering pass is given to the film in the direction normal to the first pass, the splitting is lessened, and, as shown in Table 2, good film properties are obtained.

TABLE 2.—TESTS OF CALENDERED FILMS

|  | Machine direction [a] | Transverse direction [b] |
|---|---|---|
| Tear [c] (max. load to keep tear going in gms./mil): | | |
| Sintered crystals, calendered (125° C.) 1 way | 22 | [1] |
| Sintered crystals, calendered (115° C.) 2 ways | 320 | 710 |
| LPE film (German Kalle) | 20 | 12 |
| Cellophane | 3 | 8 |
| Mylar | 13 | 31 |

|  | Tensile strength,[d] (K p.s.i.) | Elongation,[e] percent | Initial modulus,[f] (K p.s.i.) |
|---|---|---|---|
| Stress-Strain (avg. of MD [a] and TD)[b]: | | | |
| Sintered crystals, calendered (115° C.) 2 says | 6.8 | 700 | 285 |
| LPE film | 25 | 45 | |
| BPE film | 2.5 | 350 | 40 |
| Mylar | 27 | 95 | 660 |

[1] Will not tear.
[a] Direction of the first calendering operation.
[b] Direction perpendicular to the first calendering operation.
[c] Measured by ASTM-D689.
[d] In kilopounds per square inch as measured by ASTM-D882.
[e] In percentages as measured by ASTM-D882.
[f] In kilopounds per square inch as measured by ASTM-D882.
NOTE.—LPE=Linear polyethylene; Mylar=polyethylene terephthalate film manufactured by Du Pont Co.; BPE=Branched polyethylene.

The sintered aggregate could also be easily drawn in a hot bath or on a hot plate to extremely high draw ratios, often above 40 times. The products have good physical properties when tested as a fiber, as shown by item 5 in Table 1. A tenacity of 7.5 grams per denier is significantly higher than the tenacity of typical textile fibers.

In addition to the above described methods of applying a shear stress in at least one direction in the plane of the sintered aggregate, the deformation can be brought about in similar fashion by other means, such as stretching in a tenter frame.

Deformation of the sintered aggregate can be carried out at room temperature, but preferably it should be done at a temperature in the range of about 115° C. to about 125° C. The extent of elongation or drawing is preferably between about 5 times and 25 times for a film structure and up to 40 times for a filamentary structure.

Representative examples of the present invention are illustrated below:

Example 1

A slurry of single crystal platelets of linear polyethylene grown in the manner described in P. H. Geil, J. Appl. Polymer, Sci. 3 357 (1960), and W. O. Statton, J. Appl. Phys., 32 2332 (1961), was placed in a glass baking dish. The tetrachloroethylene solvent was allowed to evaporate overnight in a hood at room temperature. This deposited a reasonably uniform cake about 10 mils thick. The cake was coherent enough to be picked up from the glass, but it was brittle and could not be creased without fracture.

After annealing in an oven at 125° C. for 30 minutes, the sintered aggregate was very coherent and no longer exhibited the micaceous cleavage of the cake. The sintered aggregate showed a remarkable change in extensibility. The elongation results in Table 1 for items 1 and 2 are quantitative indications of the cohesiveness caused by the sintering.

A small machine was built to give calendering action on pieces of sintered aggregate at room temperature. The film obtained was slightly translucent and reasonably strong, as shown by items 2 and 3 in Table 1. The calendering deformation was insufficient to elongate the material to its full extent. Item 3 in Table 1 was drawn 800% in the Instron, removed to have its "denier" measured, and then extended to break.

Example 2

A sintered aggregate obtained in the manner described in Example 1 was calendered at 125° C. on a large commercial machine. This resulted in a much greater extension and the film was very clear and crackly. It was strong (item 4 in Table 1) but split readily along the direction of rolling.

Example 3

A sintered aggregate obtained in the manner described in Example 1 was calendered at 115° C. on a large commercial machine. A second calendering pass was given to the film in the direction orthogonal to the first pass. The tendency to split was reduced and a stiff, clear film was obtained, having a tear strength of 320 grams per mil in the machine direction, 710 grams per mil in the transverse direction, a tenacity of 6.8 kp. s.i., an elongation of 700% and a modulus of 285 kp. s.i., the latter three physical properties being an average of that obtained in the machine direction and transverse directions. By contrast, a commercial film of linear polyethylene shows a tear strength in the machine direction of 20 grams per mil and in the transverse direction 12 grams per mil. The commercial film of linear polyethylene shows a tensile strength of 25 kp. s.i., and an elongation of 45%. A commercial film of branched polyethylene shows a tensile strength of 2.5 kp. s.i., elongation of 350% and a modulus of 40 kp. s.i. The combination of high tear strength, high elongation and high modulus along with reasonably high tensile strength is a most surprising result and indeed entirely unexpected in a structure derived from linear polyethylene.

It is to be understood that the preceding examples are representative and that said examples may be varied within the scope of the total specification, as understood by one skilled in the art, to produce essentially the same results.

Films obtained by practicing the present invention find utility in the packaging of foodstuffs, clothing, tobacco, hardware items, machine parts, as a base for tapes, in book covers, furniture covers, agricultural and building film covers, drum liners, shipping bags, candy wraps, carton overwraps, etc.

What is claimed is:

1. A process for preparing oriented, coherent, highly crystalline sheet structures of linear polyethylene which comprises:
    (a) depositing single crystal platelets of linear polyethylene into a cake,
    (b) heating said cake at a temperature between the lowest temperature at which X-ray long period spacing is increased and a temperature about 5° C. below the melting point of said cake for a sufficient time to form a coherent, substantially homogeneous sintered aggregate, and
    (c) applying a shear stress in at least one direction in the plane of said sintered aggregate to form a film thereof.

2. The process of claim 1 wherein said cake is heated at a temperature between about 110° C. and about 5° C. below the melting point of said cake.

3. The process of claim 1 wherein said cake is heated at a temperature between about 115° C. and about 130° C.

4. The process of claim 1 wherein the sintered aggregate is maintained at a temperature of between about 115° C. and about 125° C. during the application of said shear stress.

5. The process of claim 1 wherein the sintered aggregate is elongated in at least one direction in the plane of said sintered aggregate in an amount of at least 5 times by the application of said shear stress.

6. The process of claim 1 wherein the sintered aggregate is elongated in orthogonal directions in the plane of said sintered aggregate by the application of said shear stress.

7. A highly crystalline, biaxially oriented film of the process of claim 1 comprising a sintered aggregate of single crystal platelets of linear polyethylene elongated in at least one of two orthogonal directions in the plane of said sintered aggregate, and characterized by having in either of two orthogonal directions a tear strength greater than about 250 grams per mil and elongation of greater than about 500% and a modulus greater than about 15,000 pounds per square inch.

References Cited

UNITED STATES PATENTS 3,141,912   7/1964   Goldman et al. _____ 264—95

JOSEPH L. SCHOFER, Primary Examiner

R. A. GAITHER, Assistant Examiner

U.S. Cl. X.R.

264—126, 291